(12) United States Patent
Redington et al.

(10) Patent No.: US 6,957,326 B1
(45) Date of Patent: Oct. 18, 2005

(54) METHODS AND APPARATUSES FOR EXECUTING THREADS

(75) Inventors: Jerry Redington, Amherst, NH (US); Dan Green, Boxboro, MA (US)

(73) Assignee: Turin Networks, Petaluma, CA (US)

( * ) Notice: Subject to any disclaimer, the term of this patent is extended or adjusted under 35 U.S.C. 154(b) by 317 days.

(21) Appl. No.: 10/185,210

(22) Filed: Jun. 27, 2002

Related U.S. Application Data

(60) Provisional application No. 60/302,269, filed on Jun. 28, 2001.

(51) Int. Cl.[7] .............. G06F 9/44; G06F 9/52; G06F 9/54
(52) U.S. Cl. .............................. 712/228; 712/247
(58) Field of Search ............................ 712/228, 247

(56) References Cited

U.S. PATENT DOCUMENTS 5,933,627 A * 8/1999 Parady ................ 712/228
6,128,728 A * 10/2000 Dowling ............... 712/228
6,170,051 B1 * 1/2001 Dowling ............... 712/225
6,195,739 B1 * 2/2001 Wright et al. ........... 712/19

OTHER PUBLICATIONS

Merriam-Webster's Collegiate Dictionary, 2001, Merriam-Webster Incorporated, Tenth Edition, p. 1196.*

* cited by examiner

Primary Examiner—Daniel H. Pan
(74) Attorney, Agent, or Firm—Blakely, Sokoloff, Taylor & Zafman LLP

(57) ABSTRACT

A first process thread is executed by a RISC processor using data in a first register set. While executing the first process thread, a second register set is loaded with data associated with a second process thread. The second register set has a similar number of registers as the first register set. After the execution of the first process thread is completed, the second process thread is executed using the data in the second register set.

32 Claims, 18 Drawing Sheets

METHODS AND APPARATUSES FOR EXECUTING THREADS

RELATED APPLICATIONS

This utility application is claiming priority to a provisional application filed on Jun. 28, 2001 having the Ser. No. 60/302,269.

FIELD OF THE INVENTION

The present invention relates generally to the field of process state initialization. More specifically, the present invention is related to initialization of process states in RISC (reduced instruction set computer) processors.

BACKGROUND

RISC processors are designed to perform a smaller number of types of computer instruction so that they can operate at a higher speed (perform more million instructions per second, or millions of instructions per second). Since each instruction type that a computer must perform requires additional transistors and circuitry, a larger list or set of computer instructions tends to make the processor more complicated and slower in operation.

RISC processors in general are self-initiating devices. That is they have the ability to initialize their internal state and begin a process thread in a deterministic fashion. RISC processors have two essential mechanisms, a means by which control information (i.e. RISC instructions) are fetched from a memory and applied to the RISC processor, and a means by which data items are imported and exported from the RISC processor itself.

Typically, process threads are begun when an event response is required. The thread begins by placing the RISC processor into a known state. In the known state, all applicable internal registers are set to an initial state to produce a deterministic result. This process of initialization is directed and controlled by the RISC processor. When the initialization completes, the response to the event begins. The combination of RISC directed initialization and process thread processing comprises the total compute load for an event response. In effect the RISC processor has to perform two serial tasks, initialization and execution of the process thread.

RISC processors generally initialize their process state by sequencing through a set of instructions. The set of instructions set the internal registers to desired values prior to executing a process thread. This self-configuring initialization process requires the RISC processor to consume time (compute cycles or compute bandwidth, not to mention memory bandwidth) to setup or to initialize the process thread. For real time short duration applications, the overhead of process state initialization may be longer than the execute duration of the real time application itself. This diminishes the effectiveness of the RISC processor.

SUMMARY OF THE INVENTION

In one embodiment, a method of initializing process states of a RISC processor is disclosed. A first process thread is executed using data in a first register set. While executing the first process thread, a second register set is loaded with data associated with a second process thread. The second register set has a similar number of registers as the first register set. After the execution of the first process thread is completed, the second process thread is executed using the data in the second register set.

Other objects, features and advantages of the present invention will be apparent from the accompanying drawings and from the detailed description which follows.

BRIEF DESCRIPTION OF THE DRAWINGS

The present invention is illustrated by way of example in the following drawings in which like references indicate similar elements. The following drawings disclose various embodiments of the present invention for purposes of illustration only and are not intended to limit the scope of the invention.

DETAILED DESCRIPTION

Figure 1A:
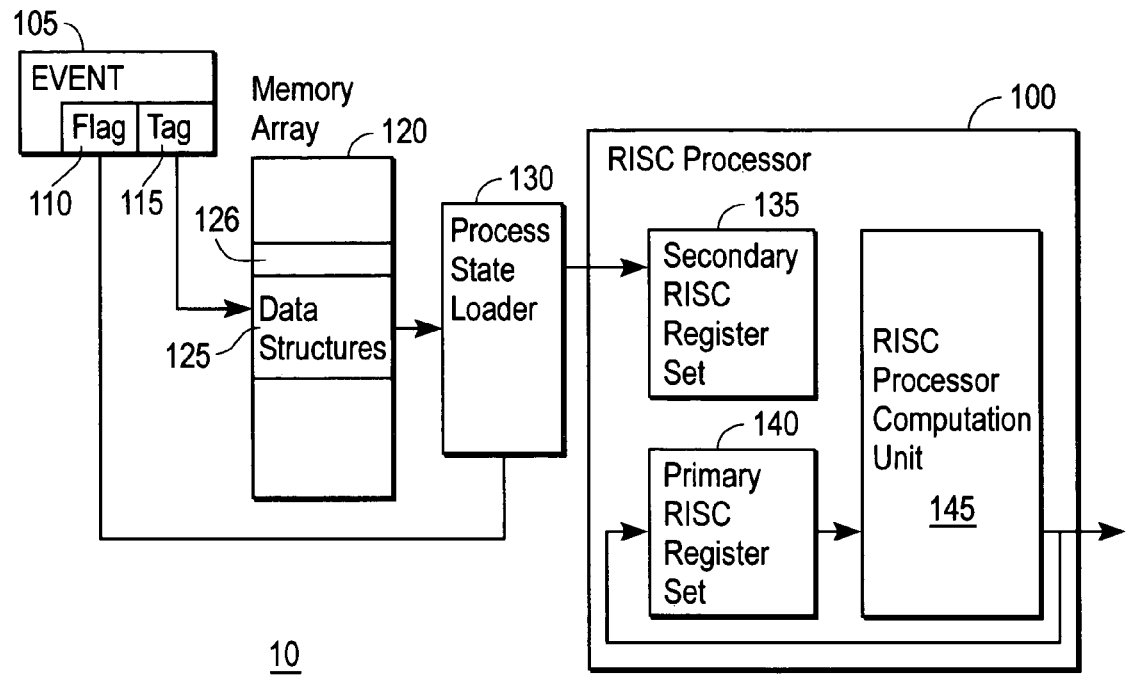
FIGS. 1A and 1B are block diagrams illustrating one embodiment of a RISC computer having a RISC processor, a primary register set, and a secondary register set in accordance to the present invention.

A method and an apparatus for initializing process states are disclosed. In one embodiment, at least two identical and independent RISC processor register sets are used. A primary register set is used by a current active process thread. A secondary register set is used to initialize a next process thread. This pipelining of the initialization process provides for greater utilization of the RISC processor.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of processes leading to a desired result. The processes are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to system for performing the operations herein. This system may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other system. Various general-purpose systems may be used with programs in accordance with the teachings herein, or it may prove convenient to construct more specialized system to perform the required method processes. The required structure for a variety of these systems will appear from the description below. In addition, the present invention is not described with reference to any particular programming language. It will be appreciated that a variety of programming languages may be used to implement the teachings of the invention as described herein.

OVERVIEW

Figure 1B:
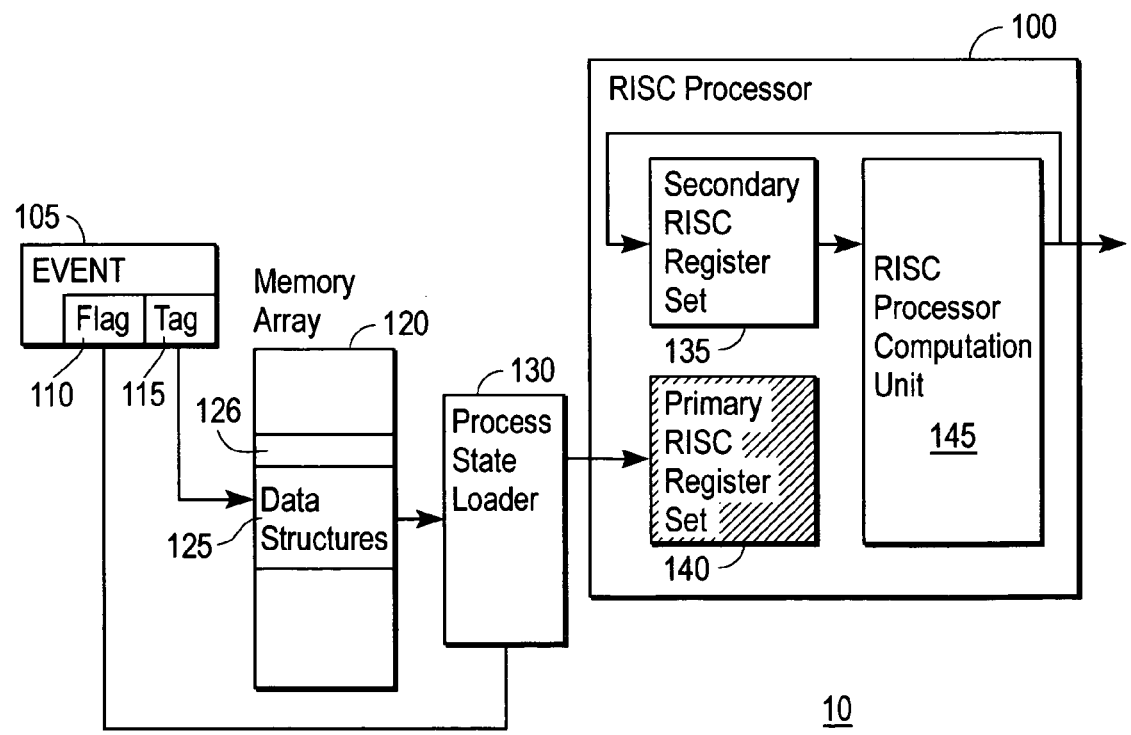

FIGS. 1A and 1B are block diagrams illustrating one embodiment of a RISC computer having a RISC processor, a primary register set, and a secondary register set in accordance to the present invention. The RISC computer 10 includes a RISC processor 100, which in its simplest form is composed of instruction addressing unit (not shown), data addressing unit (not shown), a computational unit 145, a reset mechanism (not shown), and registers 135 and 140 such as, for example, general and specific purpose register files, control registers, and status registers. All the intelligence and abilities of the RISC processor 100 resides in its instruction set and order of instruction execution. The RISC processor 100 directs and controls its internal state directly.

In one embodiment, the initialization process of the RISC processor 100 is pipelined using at least two identical copies of most or all of the internal registers of the RISC processor 100. Referring to FIG. 1A, the RISC processor 100 includes two register sets 135 and 140. Each of these two register sets 135 and 140 may perform the role of the primary register set or the role of the secondary register set. For example, as illustrated in FIG. 1A, the register set 140 is the primary register set, and the register set 135 is the secondary register set. Note the connection illustrated between the computation unit 145 and the primary register set 140.

The two register sets 135 and 140 are mutually exclusive and are peers to one another. When the primary register set 140 is in use by an application, the second or alternate register set 135 is available for loading. In one embodiment, a process state loader (PSL) 130 is used to load the secondary register set 135 in preparation for a context switch (e.g., task change). Note the connection illustrated between the PSL 130 and the secondary register set 135. When the context switch occurs, the two register sets 135 and 140 switch roles from primary to secondary and vice versa.

Referring to FIG. 1B, after the context switch occurs, the loading function of the PSL 130 continues with the secondary register set 140. This switching back and forth between the primary role and the secondary role of the register sets 135 and 140 allows for concurrency of execution and process state loading. The RISC computer 10 also includes a memory array 120 and an event generator 105. The event generator 105 is capable of generating event information, which includes event flag 110 and event tag 115.

The memory array 120 may be a single memory containing data 125 to be loaded into the secondary register set 140. The memory array 120 may also be multiple memories containing partial data sets, which aggregate to the single data 125. In either case, the data 125 is an independent record of information.

The event tag 115 is a unique identification used by the PSL 130 to index into the memory array 120 to extract the data 125. The data 125 is then loaded into the registers of the secondary register set 140 to identify a process thread. The PSL 130 may extract the data 125 from the memory array 120 for up to the number of registers in the secondary register set 140 and then deposit the data 125 into these registers.

Figure 1C:
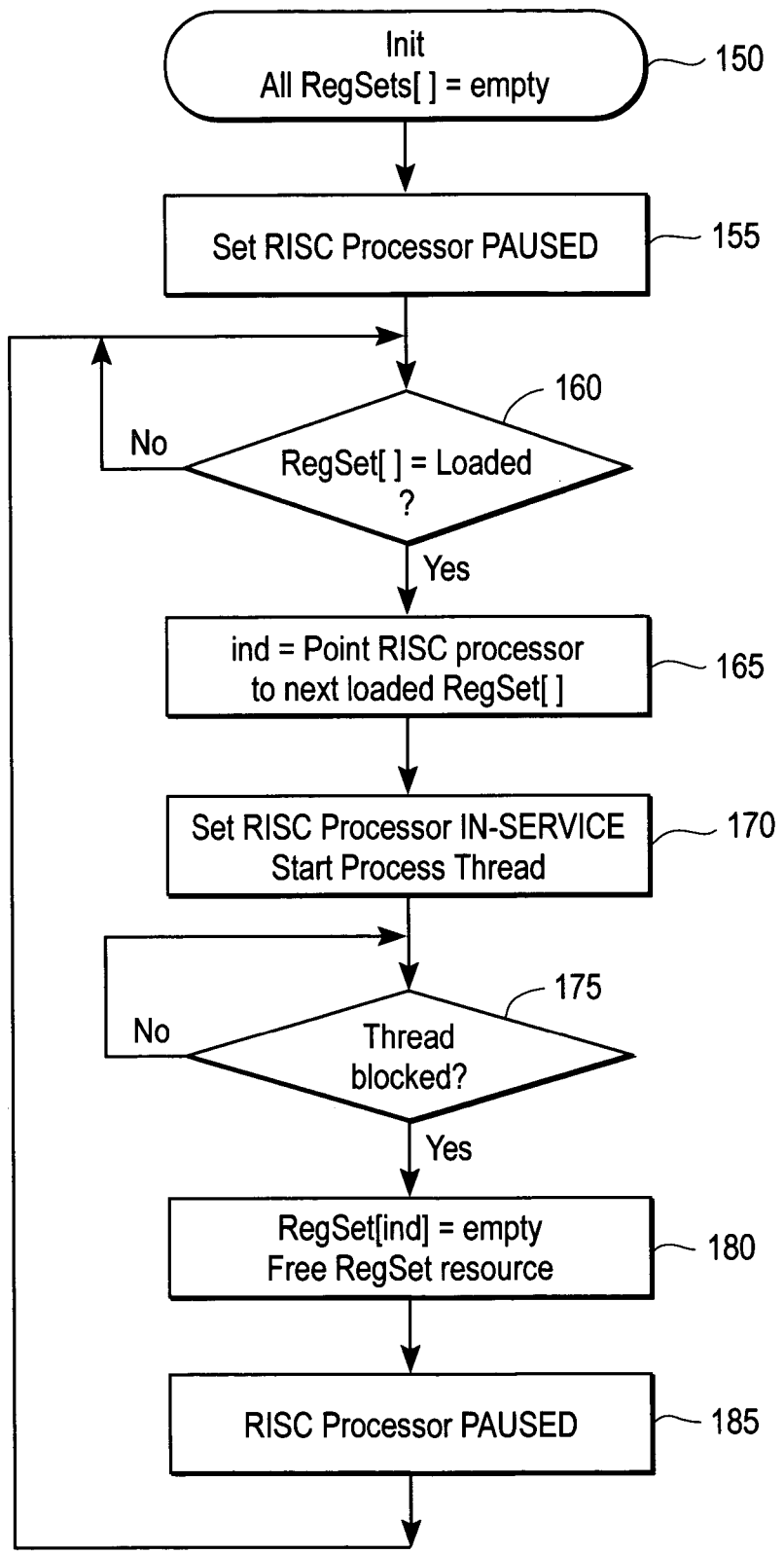
FIG. 1C is a flow diagram illustrating one embodiment of a RISC processor initialization process in accordance to the present invention.

FIG. 1C is a flow diagram illustrating one embodiment of a RISC processor initialization process in accordance to the present invention. The process starts at block 150 where all the register sets in the RISC processor are initialized to empty, which means that the register sets contain invalid data. At block 155, the RISC processor is paused, which means that the RISC processor is not performing any instruction fetch.

At block 160, a determination is made to check if a register set is loaded with data. As described above, the PSL loads the register set with data from the memory array when event information is received. If there is not a register set that is loaded, the process waits and continues to check until a register set is loaded by the PSL. When it is determined that a register set has been loaded with data by the PSL, the process flows to block 165. At block 165, an index is set to point the RISC processor to the loaded register set. Because the secondary register set is loaded with data by the PSL, the secondary register set becomes the primary register set. At block 170, the RISC processor is set to be in service, which means the RISC processor executes a process thread (or an application). The execution of the process thread continues until the process thread is blocked, as shown in block 175. When the thread is blocked, the process of FIG. 1C flows to block 180.

At block 180, the register set at the index location is reset to empty, which means that the register set becomes an available resource for the PSL to load other data. When the register set is reset to empty, its role is switched from a primary register set to a secondary register set. At block 185, the RISC processor is paused and not performing any instruction fetch. The process of FIG. 1C continues at block 160 when another register set is loaded by the PSL.

The loading of the secondary register set by the PSL may be performed as a function of the event information (e.g., dynamic event flag, event tag) and the static data located in another memory array (referred to as an indirect memory array).

Figure 2A:
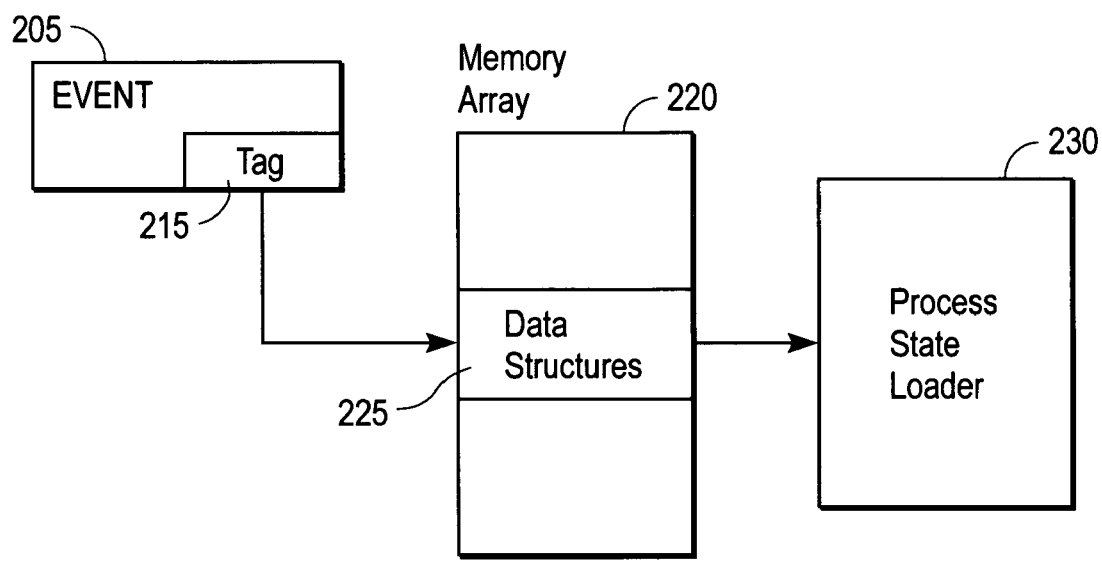
FIG. 2A is a block diagram illustrating an example of a direct lookup of data from a memory array by the process state loader (PSL).
Figure 2B:
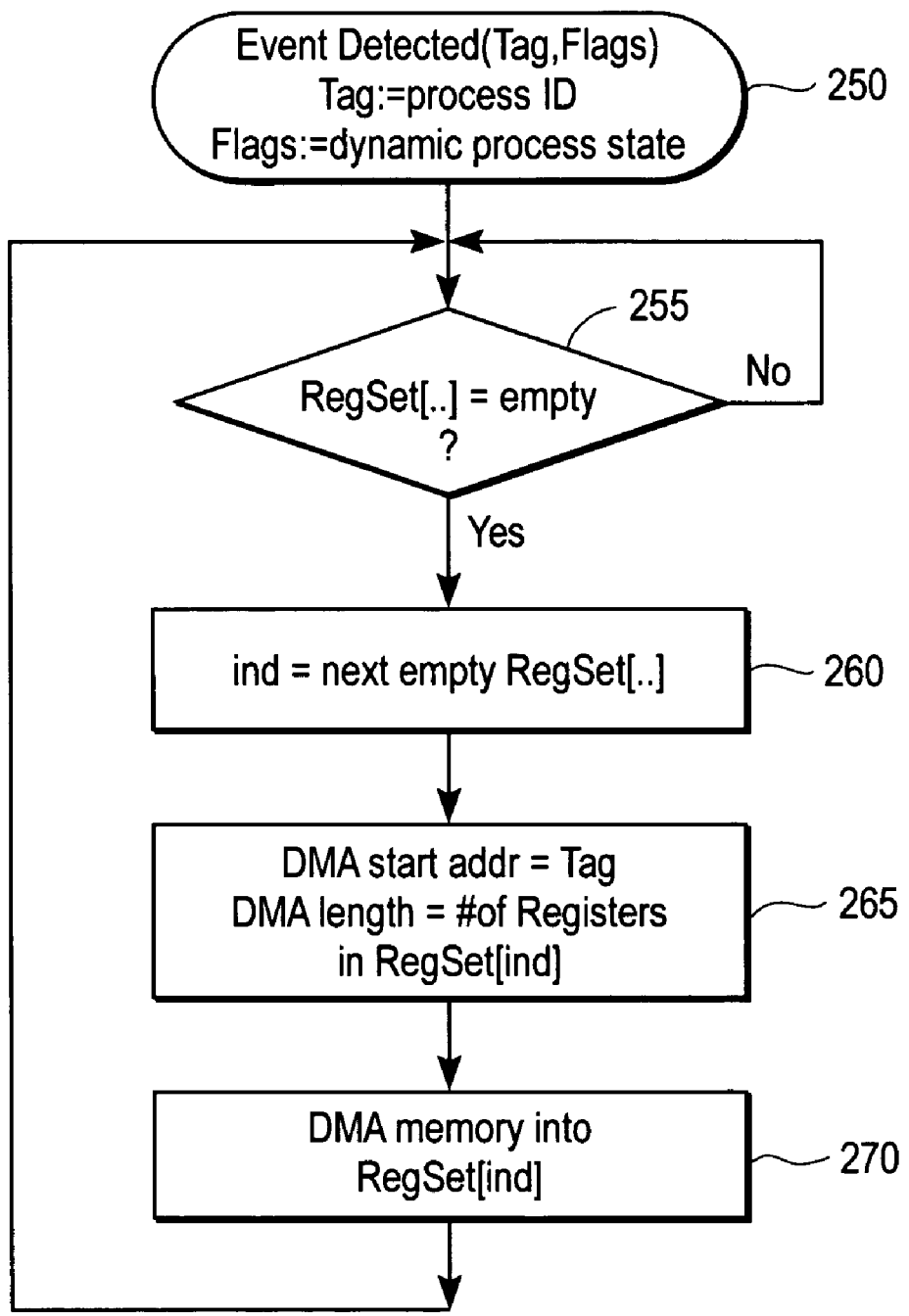
FIG. 2B is a flow diagram illustrating the direct lookup process by the PSL using the event tag.

FIG. 2A is a block diagram illustrating an example of a direct lookup of data from a memory array by the process state loader (PSL). In this example, the event tag 215 (included in an event information) provided by the event generator 205 is used by the PSL 230 as an index to the memory array 220 to access the data 225. FIG. 2B is a flow diagram illustrating the direct lookup process by the PSL using the event tag. The process starts at block 250 where an event is detected. The event includes an event tag and event flag(s). The event tag is used as process identification. The event flag(s) are not used in this example. At block 255, a determination is made to check if a register set is empty. If the register set is not empty, the process continues to check at block 255. When the register set becomes empty, the process flows to block 260 where an index is set to point to the empty register set.

At block 265, the event tag is used as a starting address of the data to be extracted from the memory array. Transferring of the data from the memory array to the registers in the register set may be performed using, for example, direct memory access (DMA). The length of the data to be transferred is dependent on the number of registers in the register set identified by the index. At block 270, the DMA operation is performed to transfer the data from the memory array to the registers in the register set. The process in FIG. 2B continues at block 255 to determine if another register set becomes empty (or becomes a secondary register set).

Figure 3A:
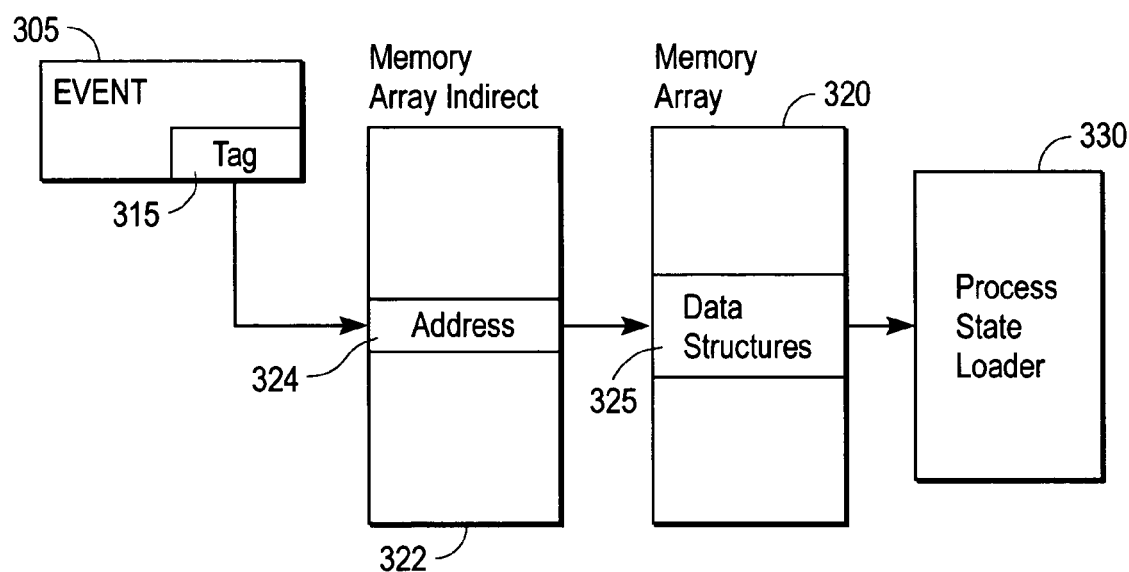
FIG. 3A is a block diagram illustrating an example of an indirect lookup of data from a memory array by the process state loader (PSL).

FIG. 3A is a block diagram illustrating an example of an indirect lookup of data from a memory array by the process state loader (PSL). In this example, the event tag 315 (included in an event information) provided by the event generator 305 is used by the PSL 230 as an index to the indirect memory array 322 to access a beginning address 324 of the data 325 in the memory array 320. The data 325 is then used by the PSL to load the register set.

Figure 3B:
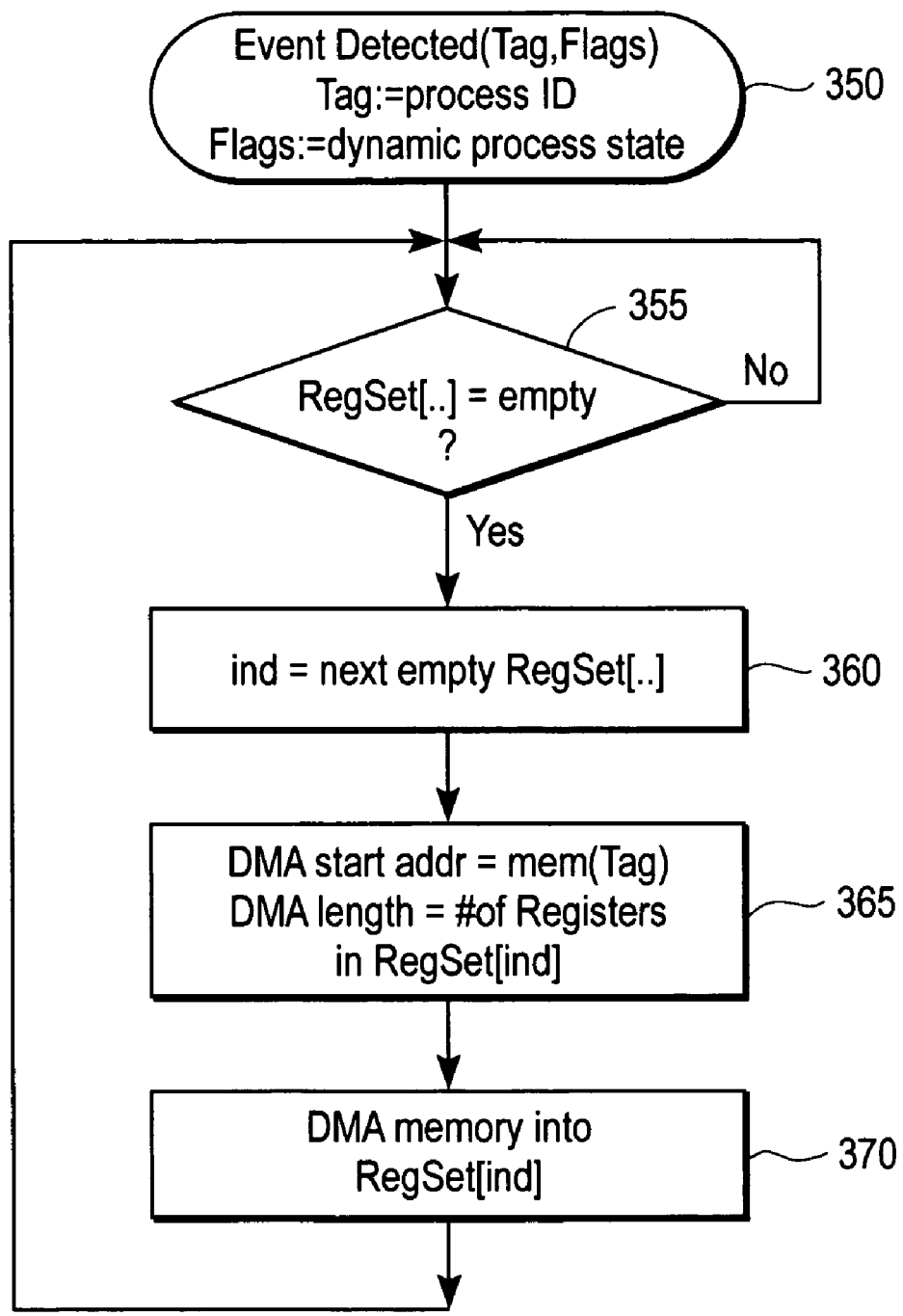
FIG. 3B is a flow diagram illustrating the indirect lookup process by the PSL using the event tag and the indirect memory array.

FIG. 3B is a flow diagram illustrating the indirect process by the PSL using the event tag and the indirect memory array. The process starts at block 350 where an event is detected. The event includes an event tag and event flag(s). The event tag is used indirectly as process identification. The event flag(s) are not used in this example. At block 355, a determination is made to check if a register set is empty. If the register set is not empty, the process continues to check at block 355. When the register set becomes empty, the process flows to block 360 where an index is set to point to the empty register set.

At block 365, the event tag is used as an index into the indirect memory array to get the starting address of the data in the memory array. This starting address of the data is used as the starting address in the DMA transfer operation. The length of the data to be transferred is dependent on the number of registers in the register set identified by the index. At block 370, the DMA operation is performed to transfer the data from the memory array to the registers in the register set. The process in FIG. 3B continues at block 355 to determine if another register set becomes empty.

Figure 4A:
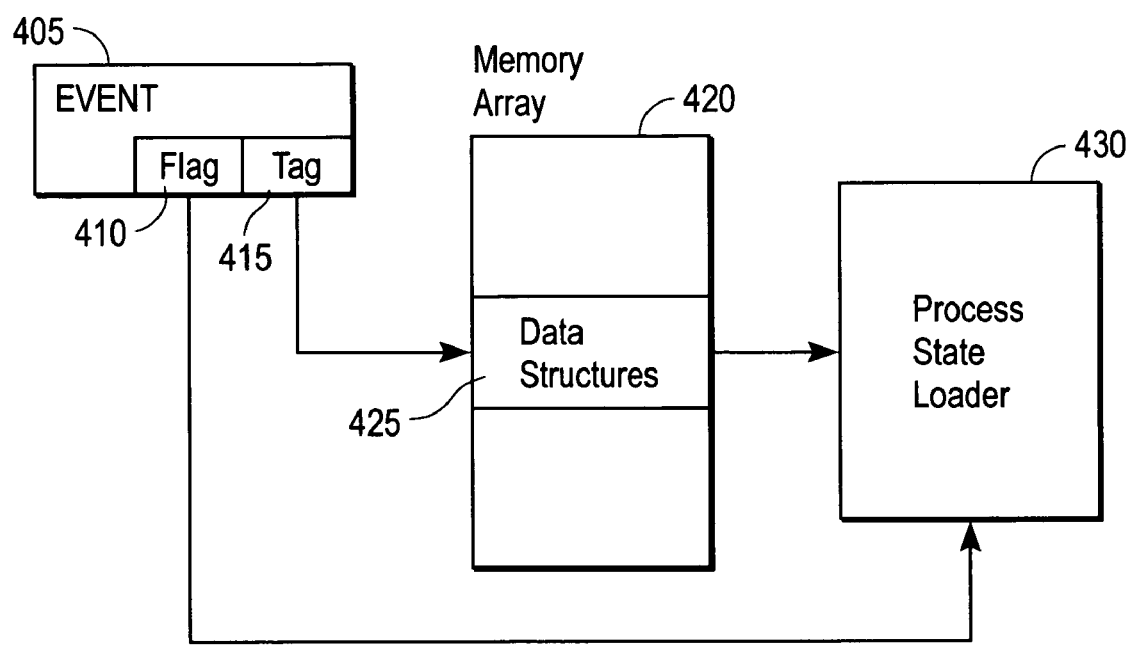
FIG. 4A is a block diagram illustrating an example of a direct lookup of data from a memory array by the process state loader (PSL) using the event flags.

FIG. 4A is a block diagram illustrating an example of a direct lookup of data from a memory array by the process state loader (PSL) using the event flags. In this example, the event tag 415 is used by the PSL 430 as an index to the memory array 420 to access the data 425. In one embodiment, in order to conditionally load specific registers in the secondary register set, the PSL 430 uses the event flag(s) 410. This is referred to as flag-based loading. The event flag(s) 410 provides dynamic state information and may contain individual or group of flag bits per condition to allow the PSL 430 to load a single register or to load multiple registers in the secondary register set. This is illustrated by the connection between the event flag(s) 410 and the PSL 430. Using flag-based loading, the conditional testing and branching within the process thread can be eliminated, yielding more efficient and compact code segments. Using flag-based loading also increases register utilization within the RISC processor. There is no need to use two or more register values to satisfy a product of a conditional test.

Figure 4B:
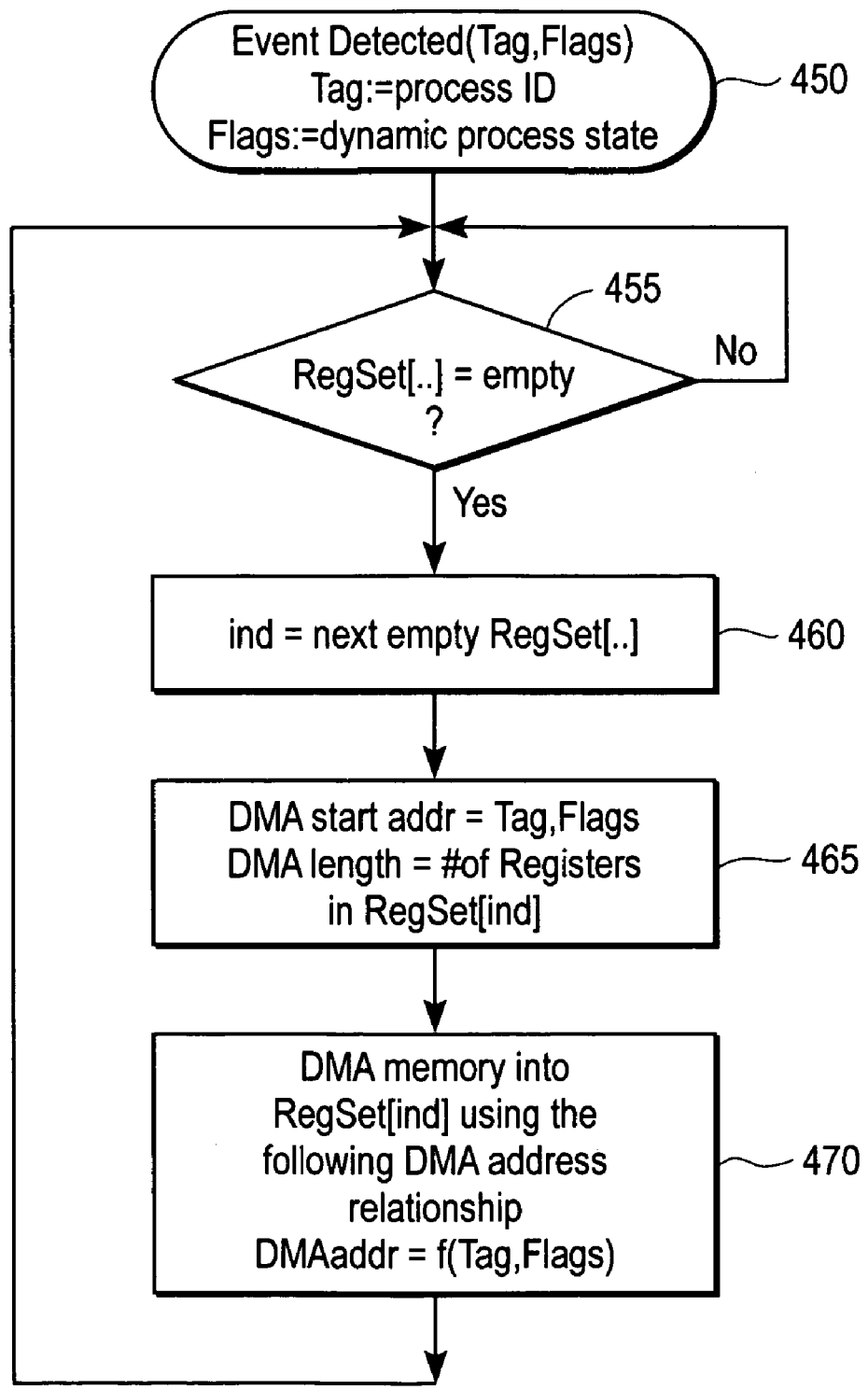
FIG. 4B is a flow diagram illustrating the direct lookup process by the PSL using the event tag and the event flag(s).

FIG. 4B is a flow diagram illustrating the direct lookup process by the PSL using the event tag and the event flag(s). The process starts at block 450 where an event is detected. The event includes an event tag and event flag(s). The event tag is used as process identification. The event flag(s) are used in this example to conditionally load the registers in the register set (referred to as dynamic process state). At block 455, a determination is made to check if a register set is empty. If the register set is not empty, the process continues to check at block 455. When the register set becomes empty, the process flows to block 460 where an index is set to point to the empty register set.

At block 465, the event tag and the event flags are used to determine a starting address of the data to be extracted from the memory array. The length of the data to be transferred is determined by the number of registers in the register set identified by the index. At block 470, the DMA operation is performed to transfer the data from the memory array to the registers in the register set. As shown in block 470, the DMA starting address in this embodiment is a function of the event tag and the event flags. The process in FIG. 4B continues at block 455 to determine if another register set becomes empty.

Figure 5A:
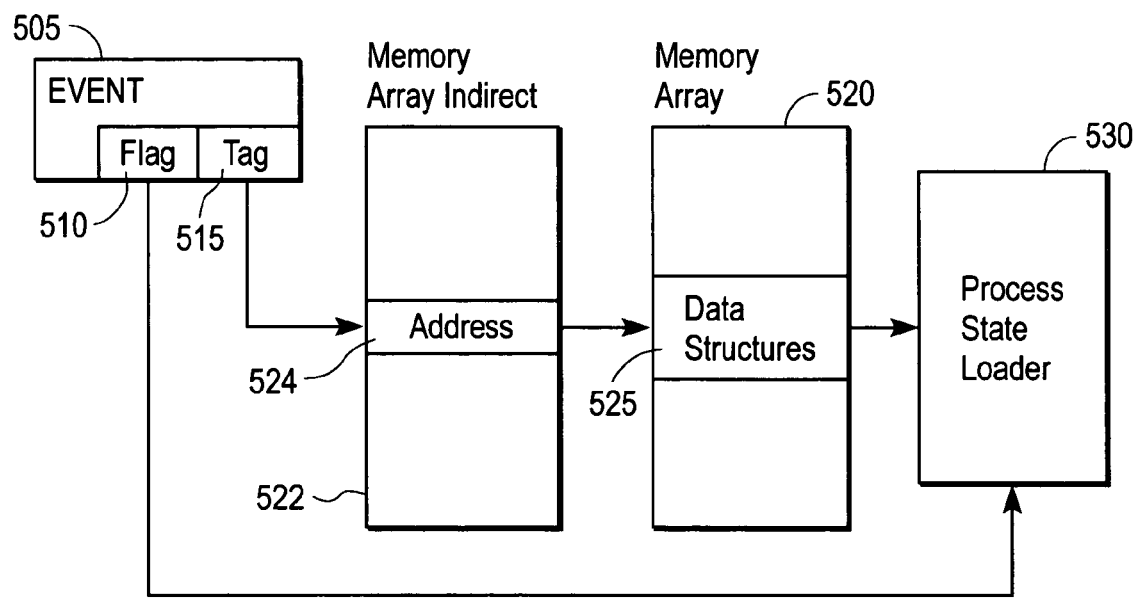
FIG. 5A is a block diagram illustrating an example of an indirect lookup of data from a memory array by the process state loader (PSL) using the event flags.

FIG. 5A is a block diagram illustrating an example of an indirect lookup of data from a memory array by the process state loader (PSL) using the event flags. In this example, the event tag 515 provided by the event generator 505 is used by the PSL 530 as an index to the indirect memory array 522 to access a beginning address 524 of the data 525 in the memory array 520. The PSL 530 also uses the event flag(s) 510 to conditionally load the data 525 from the memory array 520 into the secondary register set. As described above, the event flag(s) 510 provides dynamic state information and may contain individual or group of flag bits per condition to allow the PSL 530 to load a single register or to load multiple registers in the secondary register set.

Figure 5B:
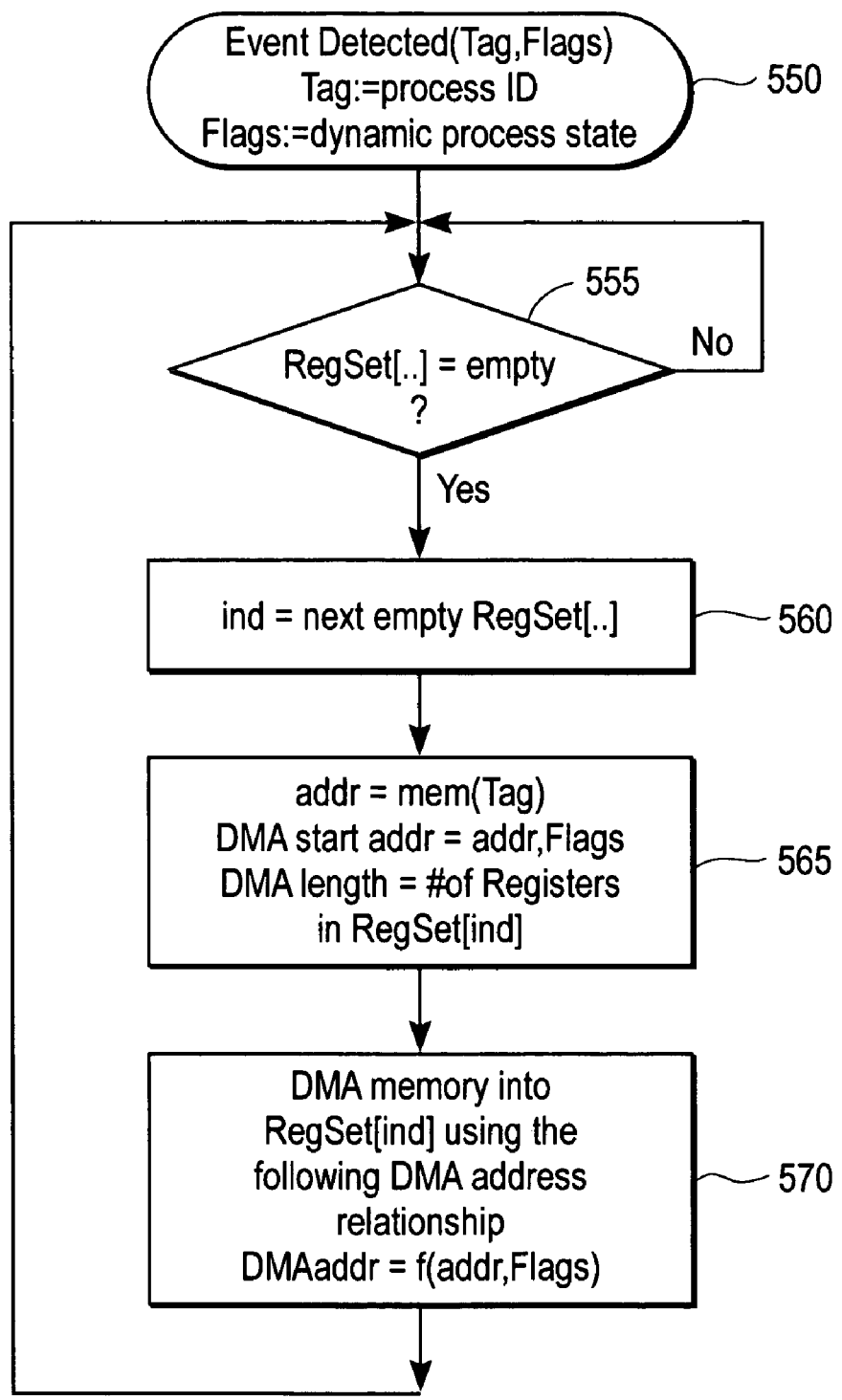
FIG. 5B is a flow diagram illustrating the indirect lookup process by the PSL using the event tag, the indirect memory array, and the event flags.

FIG. 5B is a flow diagram illustrating the indirect lookup process by the PSL using the event tag, the indirect memory array, and the event flags. The process starts at block 550 where an event is detected. The event includes an event tag and event flag(s). The event tag is used indirectly as process identification. The event flag(s) are used to conditionally load the data into the secondary register. At block 555, a determination is made to check if a register set is empty. If the register set is not empty, the process continues to check at block 555. When the register set becomes empty, the process flows to block 560 where an index is set to point to the empty register set.

At block 565, the event tag is used as an index into the indirect memory array to get the starting address of the data in the memory array. This starting address of the data and the event flags are used as the starting address in the DMA transfer operation. The length of the data to be transferred is dependent on the number of registers in the register set identified by the index. At block 570, the DMA operation is performed to transfer the data from the memory array to the registers in the register set. As shown in block 570, the DMA starting address in this embodiment is a function of the event tag and the event flags. The process in FIG. 5B continues at block 555 to determine if another register set becomes empty.

Figure 6A:
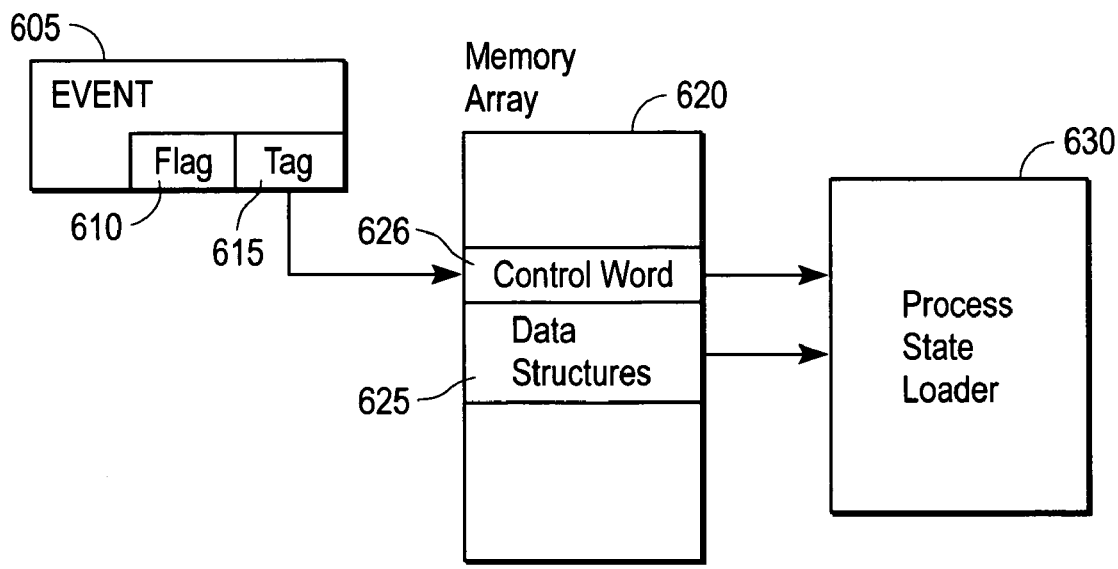
FIG. 6A is a block diagram illustrating an example of a direct lookup of data from a memory array by the process state loader (PSL) using a control word.

FIG. 6A is a block diagram illustrating an example of a direct lookup of data from a memory array by the process state loader (PSL) using a control word. In this example, the event tag 615 provided by the event generator 605 is used by the PSL 630 as an index to the memory array 620 to access a control word 626. The control word 626 is used when it is desirable that less than the full number of registers in the register set is to be written with the data 625. The control word 626 in the memory array 620 is used to direct the PSL 630 to load the data 625 into the register set. For example, the control word 626 may have bits set to indicate the registers in the register set to be written with the data 625.

Figure 6B:
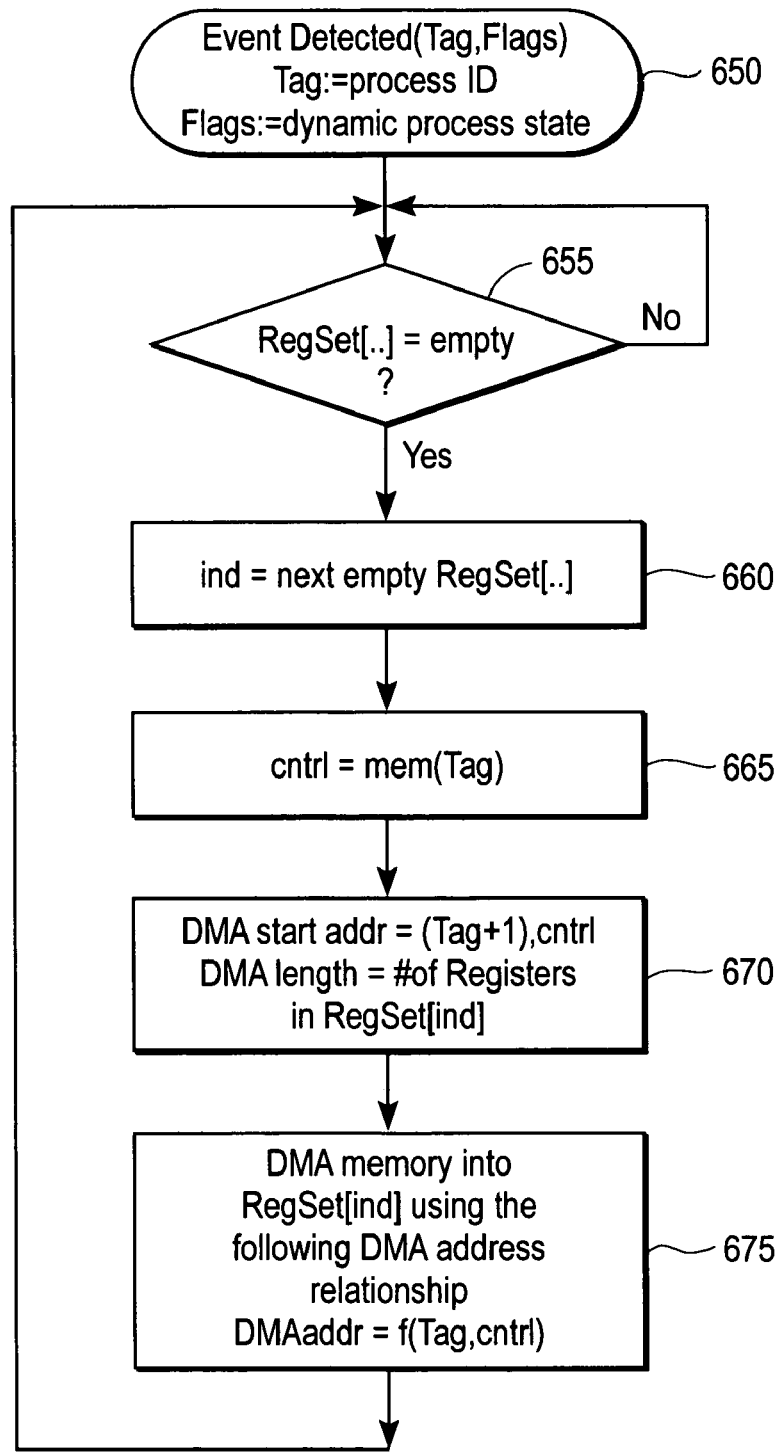
FIG. 6B is a flow diagram illustrating the direct lookup process by the PSL using the event tag and the control word.

FIG. 6B is a flow diagram illustrating the direct lookup process by the PSL using the event tag and the control word. The process starts at block 650 where an event is detected. The event includes an event tag and event flag(s). The event tag is used as process identification. The event flag(s) are not used in this example. At block 655, a determination is made to check if a register set is empty. If the register set is not empty, the process continues to check at block 655. When the register set becomes empty, the process flows to block 660 where an index is set to point to the empty register set.

At block 665, the event tag is used to access a control word from the memory array. In one embodiment, the control word is stored contiguously with the data (to be loaded in the secondary register set) in the memory array. At block 670, the beginning address of the data (i.e., tag+1) and the control word are used to determine the starting address for the DMA operation to extract the data from the memory array. The length of the data to be transferred is determined based on the number of registers in the register set identified by the index. At block 675, the DMA operation is performed to transfer the data from the memory array into the registers in the register set. As shown in block 670, the DMA address in this embodiment is a function of the event tag and the control word. The process in FIG. 6B continues at block 655 to determine if another register set becomes empty.

Figure 7A:
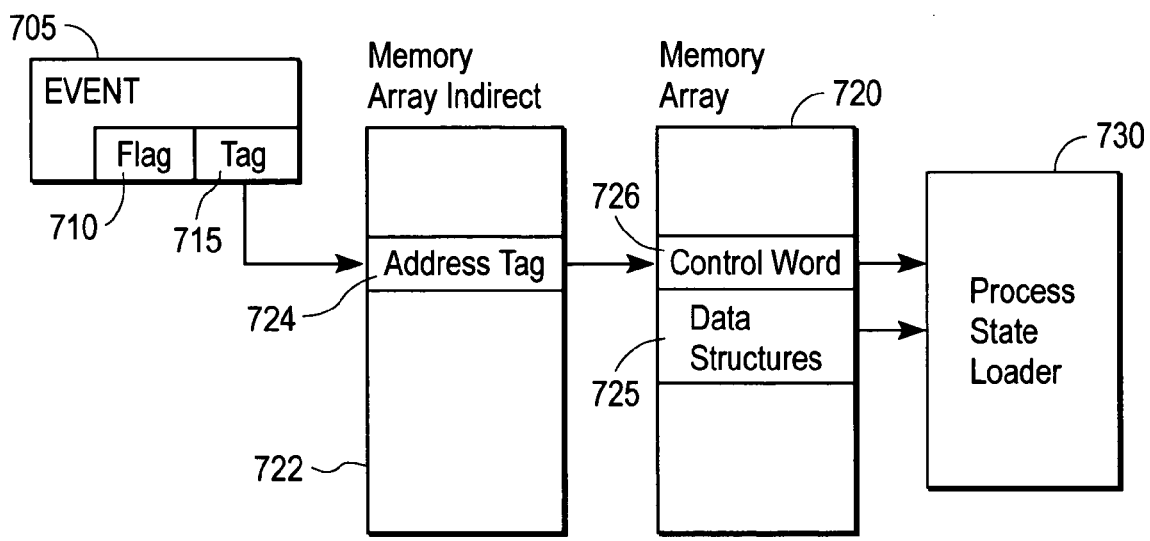
FIG. 7A is a block diagram illustrating an example of an indirect lookup of data from a memory array by the process state loader (PSL) using an event tag and a control word.

FIG. 7A is a block diagram illustrating an example of an indirect lookup of data from a memory array by the process state loader (PSL) using an event tag and a control word. In this example, the event tag 715 provided by the event generator 705 is used by the PSL 730 as an index to the indirect memory array 722 to access an address 724 of the control word 726 in the memory array 720. The data 725 is contiguous with the control word 726 in the memory array 720. As described above, the control word 726 is used when it is desirable that less than the full number of registers in the register set is to be written with the data 725.

Figure 7B:
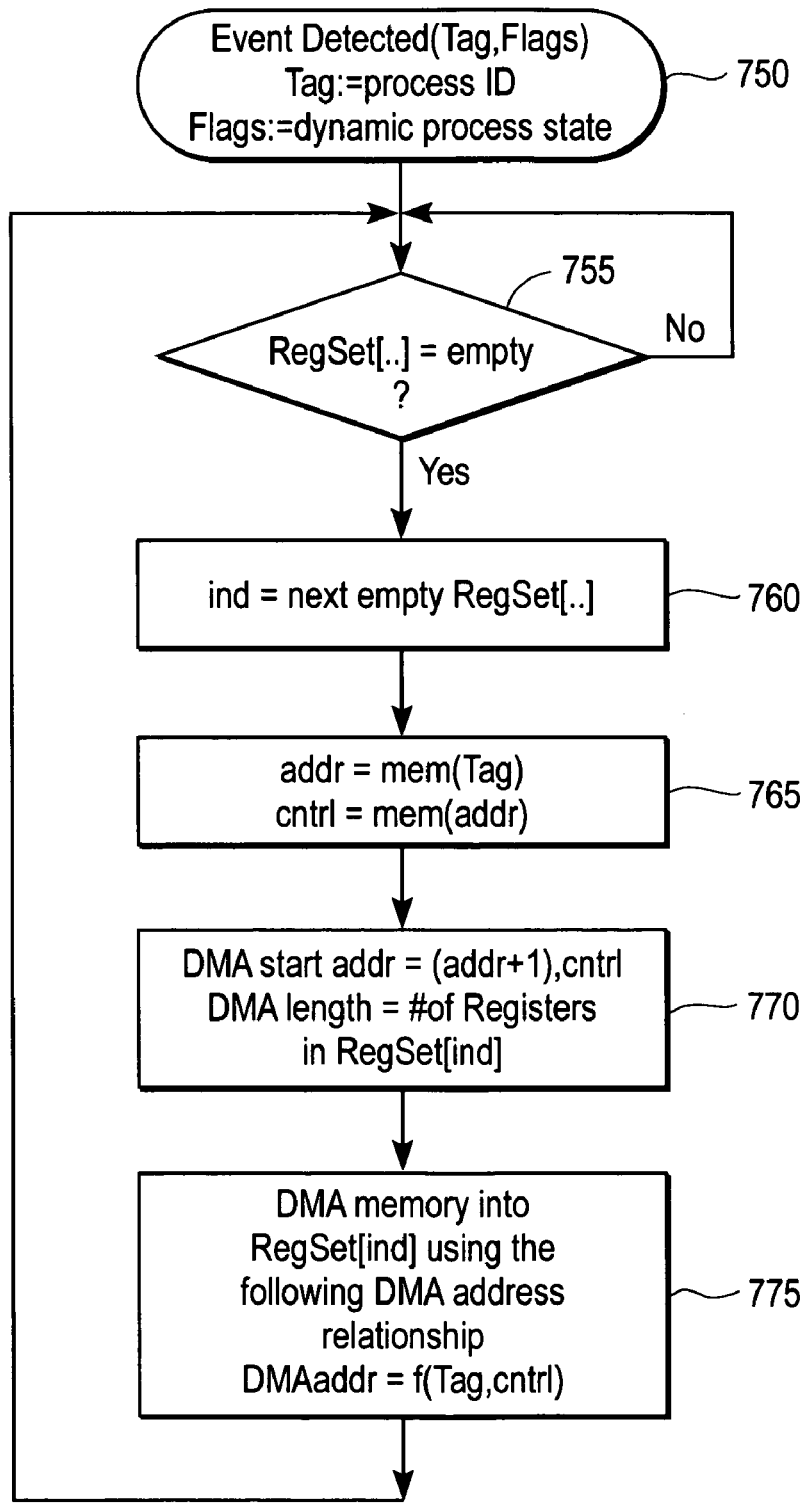
FIG. 7B is a flow diagram illustrating the indirect lookup process by the PSL using the event tag, the indirect memory array, and the control word.

FIG. 7B is a flow diagram illustrating the indirect lookup process by the PSL using the event tag, the indirect memory array, and the control word. The process starts at block 750 where an event is detected. The event includes an event tag and event flag(s). The event tag is used indirectly as process identification. The event flag(s) are not used in this example. At block 755, a determination is made to check if a register set is empty. If the register set is not empty, the process continues to check at block 755. When the register set becomes empty, the process flows to block 760 where an index is set to point to the empty register set.

At block 765, the event tag is used as an index into the indirect memory array to get the address of the control word in the memory array. In this example, the address of the control word is consecutive from the beginning address of the data to be written into the registers in the register set. This beginning address of the data and the control word are used to determine the starting address of the DMA transfer operation. The length of the data to be transferred is based on the number of registers in the register set identified by the index, as shown in block 770. At block 775, the DMA operation is performed to transfer the data from the memory array to the registers in the register set. As shown in block 775, the DMA address in this embodiment is a function of the event tag and the control word. The process in FIG. 7B continues at block 755 to determine if another register set becomes empty.

Figure 8A:
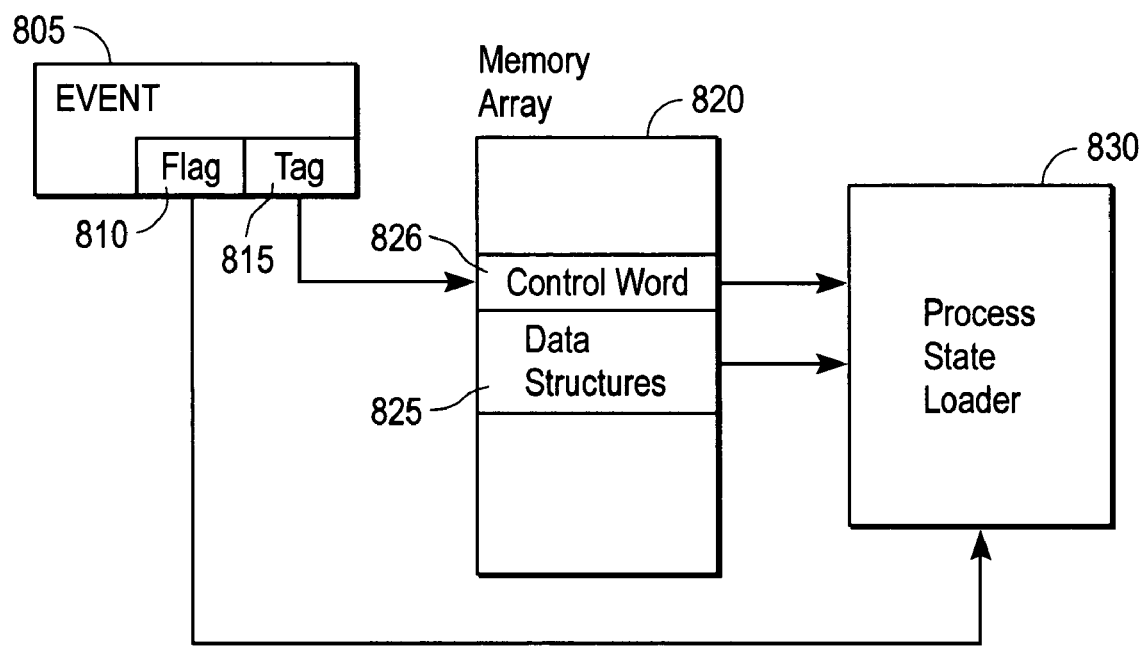
FIG. 8A is a block diagram illustrating an example of a direct lookup of data from a memory array by the process state loader (PSL) using an event tag, event flags, and a control word.

FIG. 8A is a block diagram illustrating an example of a direct lookup of data from a memory array by the process state loader (PSL) using an event tag, event flags, and a control word. In this example, the event tag 815 provided by the event generator 805 is used by the PSL 830 as an index to the memory array 820 to access a control word 826. As described above, the control word 826 is used when it is desirable that less than the full number of registers in the register set is to be written with the data 825. The control word 826 in the memory array 820 is used to direct the PSL 830 to load the data 825 into the register set. In addition to using the control word 826, the PSL 830 also uses the event flags 810 to control the loading of the data 825 into the register set. As described above, the event flag(s) 810 provides dynamic state information and may contain individual or group of flag bits per condition to allow the PSL 830 to load a single register or to load multiple registers in the register set.

Figure 8B:
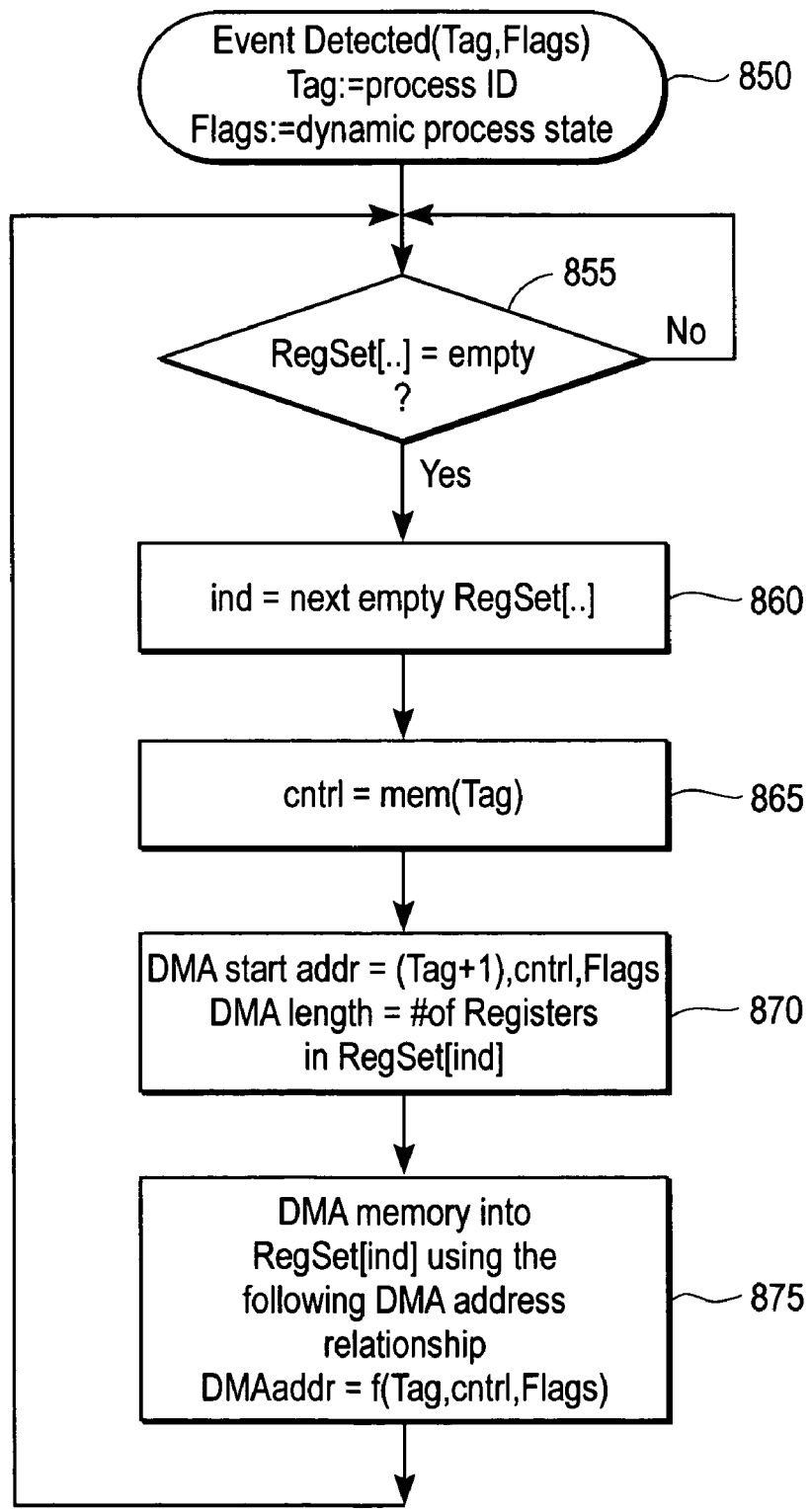
FIG. 8B is a flow diagram illustrating the direct lookup process by the PSL using the event tag, event flag(s), and the control word.

FIG. 8B is a flow diagram illustrating the direct lookup process by the PSL using the event tag, event flag(s), and the control word. The process starts at block 850 where an event is detected. The event includes an event tag and event flag(s). The event tag is used as process identification. The event flag(s) are used in this example to conditionally load the register set. At block 855, a determination is made to check if a register set is empty. If the register set is not empty, the process continues to check at block 855. When the register set becomes empty, the process flows to block 860 where an index is set to point to the empty register set.

At block 865, the event tag is used to access a control word from the memory array. In one embodiment, the control word is stored contiguously with the data (to be loaded in the secondary register set) in the memory array. At block 870, the beginning address of the data (i.e., tag+1), the control word, and the event tag(s) are used to determine the starting address for the DMA operation to extract the data from the memory array. The length of the data to be transferred is determined based on the number of registers in the register set identified by the index. At bock 875, the DMA operation is performed to transfer the data from the memory array into the registers in the register set based on the controlling information in the control word and in the event flag(s). As shown in block 875, the DMA address in this embodiment is a function of the event tag, the event flag(s) and the control word. The process in FIG. 8B continues at block 855 to determine if another register set becomes empty.

Figure 9A:
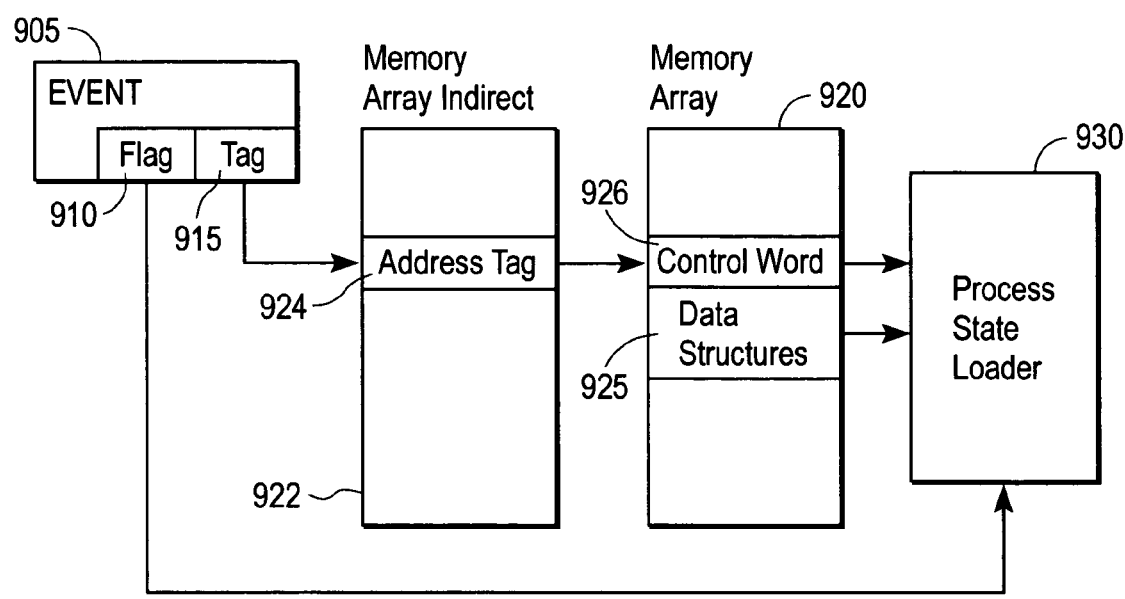
FIG. 9A is a block diagram illustrating an example of an indirect lookup of data from a memory array by the process state loader (PSL) using an event tag, event flags, an indirect memory array, and a control word.

FIG. 9A is a block diagram illustrating an example of an indirect lookup of data from a memory array by the process state loader (PSL) using an event tag, event flags, an indirect memory array, and a control word. In this example, the event tag 915 provided by the event generator 905 is used by the PSL 930 as an index to the indirect memory array 922 to access an address 924 of the control word 926 in the memory array 920. The control word 926 is used when it is desirable that less than the full number of registers in the register set is to be written with the data 925. The control word 926 in the memory array 920 is used to direct the PSL 930 to load the data 925 into the register set. In addition to using the control word 926, the PSL 930 also uses the event flags 910 to control the loading of the data 925 into the register set. The event flag(s) 910 provides dynamic state information and may contain individual or group of flag bits per condition to allow the PSL 930 to load a single register or to load multiple registers in the register set.

Figure 9B:
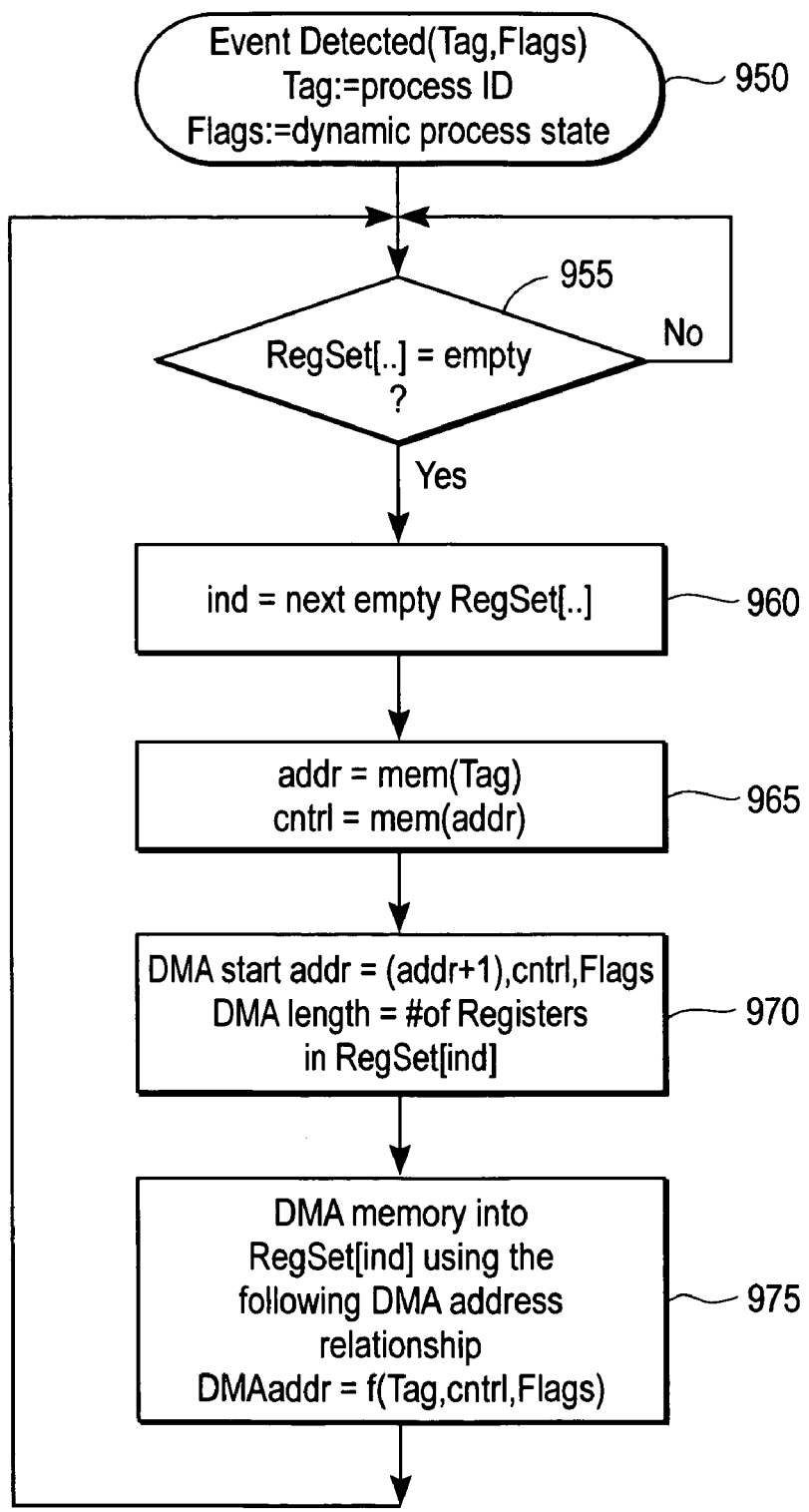
FIG. 9B is a flow diagram illustrating the indirect lookup process by the PSL using the event tag, event flag(s), the indirect memory array, and the control word.

FIG. 9B is a flow diagram illustrating the indirect lookup process by the PSL using the event tag, event flag(s), the indirect memory array, and the control word. The process starts at block 950 where an event is detected. The event includes an event tag and event flag(s). The event tag is used as process identification. The event flag(s) are used in this example to conditionally load the register set. At block 955, a determination is made to check if a register set is empty. If the register set is not empty, the process continues to check at block 955. When the register set becomes empty, the process flows to block 960 where an index is set to point to the empty register set.

At block 965, the event tag is used as an index into the indirect memory array to access an address of the control word. This is the address in the memory array where the control word can be accessed. In one embodiment, the control word is stored contiguously with the data (to be loaded in the secondary register set) in the memory array. At block 970, the beginning address of the data (i.e., address+1), the control word, and the event tag(s) are used to determine the starting address for the DMA operation to extract the data from the memory array. The length of the data to be transferred is determined based on the number of registers in the register set identified by the index. At bock 975, the DMA operation is performed to transfer the data from the memory array into the registers in the register set based on the controlling information in the control word and in the event flag(s). As shown in block 975, the DMA address in this embodiment is a function of the event tag, the event flag(s) and the control word. The process in FIG. 9B continues at block 955 to determine if another register set becomes empty.

Thus, by using the control word in addition to the event flags, additional load flexibility is possible. For example, the control word may be used to describe how the event flag(s) influences the loading of the specific registers in the register set. The control word may be accessed directly or indirectly as a function of the event tag, as illustrated in FIG. 6A, and FIG. 7A, respectively. The control word may contain either explicit or implicit formatting information that specifies which conditional event flag (or groups of conditional event flag) to evaluate in order to select the appropriate data in the memory array. The selected data is then loaded into the corresponding specific registers in the register set.

Methods and systems for improving process state initialization in a RISC processor have been disclosed. The use of the identical register sets increases the overall available computation bandwidth of the RISC processor. The loading of the process state information into the register set is more time efficient because the loading process is no longer tied to the RISC processor memory load/store facilities. Another advantage of autonomously loading the RISC processor without the involvement of the RISC processor is the ability to conditionally load specific registers based on the dynamic flag conditions.

From the above description and drawings, it will be understood by those of ordinary skill in the art that the particular embodiments shown and described are for purposes of illustration only and are not intended to limit the scope of the invention. Those of ordinary skill in the art will recognize that the invention may be embodied in other specific forms without departing from its spirit or essential characteristics. References to details of particular embodiments are not intended to limit the scope of the claims.

What is claimed is:

1. A method performed by a network processor, comprising executing a first process thread using data in a first register set;
   while executing the first process thread, in response to an event having an event tag and an event flag, loading a second register set with data associated with a second process thread, wherein the second register set has a similar number of registers as the first register set, wherein the event tag indicates a location of a first memory from which the data is loaded and the event flag indicates which portion of the data stored at the location of the first memory should be loaded; and
   after said executing of the first process thread is completed, executing the second process thread using the data in the second register set.

2. The method of claim 1, further comprising:
   while executing the second process thread using the data in the second register set, loading the first register set with data associated with a third process thread.

3. The method of claim 1, wherein the second register set is a duplicate of the first register set.

4. The method of claim 1, wherein an amount of the data associated with the second process thread based on a number of registers in the second register set.

5. The method of claim 1, wherein the event tag is used to access a control word from the first memory, wherein the control word is used to indicate an amount of valid data stored in the first memory when the amount of valid data is less than the data associated with the second process thread.

6. The method of claim 5, wherein a location of the control word in the first memory referenced by the event tag is immediately prior to a location of the data associated with the second process thread.

7. The method of claim 1, wherein the event flag is used to conditionally load the data associated with the second process thread into the registers in the second register set.

8. The method of claim 1, wherein using the event tag to access the data associated with the second process thread from the first memory comprises:
using the event tag as an index to a second memory to access an address to index to the first memory, the address to index to the first memory used to access the data associated with the second process thread in the first memory.

9. The method of claim 8, wherein the address to index to the first memory points to a control word used to indicate an amount of valid data stored in the first memory when the amount of valid data is less than the data associated with the second process thread.

10. The method of claim 8, wherein the address to index to the first memory points to the data associated with the second process thread.

11. A computer readable medium having stored thereon sequences of instructions which are executable by a system, and which, when executed by the system, cause the system to:
execute a first process thread using data in a first register set;
while executing the first process thread, in response to an event having an event tag and an event flag, load a second register set with data associated with a second process thread, wherein the second register set has a similar number of registers as the first register set, wherein the event tag indicates a location of a first memory from which the data is loaded and the event flag indicates which portion of the data stored at the location of the first memory should be loaded; and
after said executing of the first process thread is completed, execute the second process thread using the data in the second register set.

12. The computer readable medium of claim 11, further comprising instructions to cause the system to:
while executing the second process thread using the data in the second register set, load the first register set with data associated with a third process thread.

13. The computer readable medium of claim 11, wherein the second register set is a duplicate of the first register set.

14. The computer readable medium of claim 11, wherein an amount of the data associated with the second process thread based on a number of registers in the second register set.

15. The computer readable medium of claim 11, wherein the event tag is used to access a control word from the first memory, wherein the control word is used to indicate an amount of valid data stored in the first memory when the amount of valid data is less than the data associated with the second process thread.

16. The computer readable medium of claim 15, wherein a location of the control word in the first memory referenced by the event tag is immediately prior to a location of the data associated with the second process thread.

17. The computer readable medium of claim 11, wherein the event flag is used to conditionally load the data associated with the second process thread into the registers in the second register set.

18. The computer readable medium of claim 11, wherein the instructions to cause the system to use the event tag to access the data associated with the second process thread from the first memory comprises instructions to:
use the event tag as an index to a second memory to access an address to index to the first memory, the address to index to the first memory used to access the data associated with the second process thread in the first memory.

19. The computer readable medium of claim 18, wherein the address to index to the first memory points to a control word used to indicate an amount of valid data stored in the first memory when the amount of valid data is less than the data associated with the second process thread.

20. The computer readable medium of claim 18, wherein the address to index to the first memory points to the data associated with the second process thread.

21. A system, comprising:
a reduced instruction set computer (RISC) processor, the RISC processor including a first register set and a second register set, the second register set being a duplicate of the first register set; and
a memory coupled to the RISC processor, wherein the first register set is initialized to a first state using a first data from the memory to enable the RISC processor to process a first thread, wherein the second register set is initialized to a second state using a second data from the memory in response to an event while the RISC processor is processing the first thread, and wherein the event includes an event tag and an event flag, the event tag indicating a location of the memory from which the second data is loaded and the event flag indicating which portion of the data stored in the location of the memory referenced by the event tag should be loaded.

22. The system of claim 21, further comprising a process state loader (PSL) coupled to the RISC processor and the memory, wherein the PSL loads the first data to the first register set and the PSL loads the second data to the second register set while the RISC processor is processing the first thread using the data from the first register set.

23. The system of claim 22, further comprising an event generator coupled to the PSL and the memory to generate the event, wherein the PSL loads in response to receiving the event from the event generator.

24. The system of claim 23, wherein the event tag is used to access one of the first data and the second data from the memory.

25. The system of claim 24, wherein the event tag is used as an index to the memory.

26. The system of claim 25, wherein the event tag is used to access a control word in the memory.

27. The system of claim 26, wherein the control word is used to direct how much of the first data is to be loaded into the first register set and how much of the second data is to be loaded into the second register set.

28. The system of claim 24, wherein the event tag is used as an index to an indirect memory to access an address to the memory.

29. The system of claim 28, wherein the address to the memory is used to access a control word in the memory.

30. The system of claim 28, wherein the address to the memory is used to access one of the first data and the second data in the memory.

31. The system of claim 24, wherein the event further includes one or more event flags, and wherein the one or more event flags are used to conditionally load the first data to the first register set and the second data to the second register set.

32. A system, comprising:
   means for executing a first process thread using data in a first register set;
   means for loading a second register set with data associated with a second process thread, while executing the first process thread, in response to an event having an event tag and an event flag, wherein the second resister set has a similar number of registers as the first register set, wherein the event tag indicates a location of a first memory from which the data is loaded and the event flag indicates which portion of the data stored at the location of the first memory should be loaded; and
   means for executing, after said executing of the first process thread is completed, the second process thread using the data in the second register set.

* * * * *